N. Jenkins,
Balance Valve.
No. 113,523.        Patented Apr. 11, 1871.
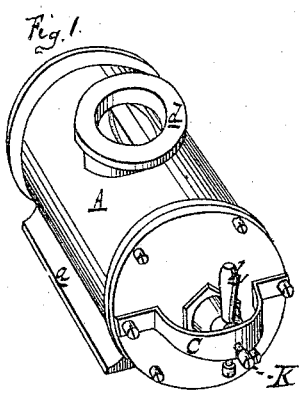
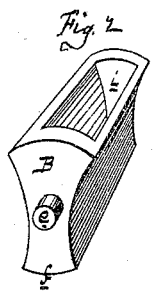
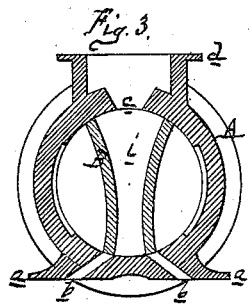
Attest,
H. S. Sprague.
R. S. Mallory.
Inventor.
N. Jenkins
Per Atty
Thos S Sprague

United States Patent Office.

NELSON JENKINS, OF DETROIT, MICHIGAN.

Letters Patent No. 113,523, dated April 11, 1871.

IMPROVEMENT IN BALANCE-VALVES FOR STEAM-ENGINES.

The Schedule referred to in these Letters Patent and making part of the same.

*To whom it may concern:*

Be it known that I, NELSON JENKINS, of Detroit, in the county of Wayne and State of Michigan, have invented a new and useful Improvement in Balanced Valves for Steam-Engines; and I do declare that the following is a true and accurate description thereof, reference being had to the accompanying drawing and to the letters of reference marked thereon and being a part of this specification.

Figure 1 is a perspective view of a steam-chest inclosing my valve, and showing my method of setting the same when worn.

Figure 2 is a perspective view of my valve.

Figure 3 is a vertical section of the same.

Like letters indicate like parts in each figure.

The nature of this invention relates to an improved construction of steam-valves, which govern the admission and emission of steam into and out of steam-engines, said valve being so constructed as to be balanced in the steam-chest with an equal pressure of steam upon its sides, and operated by the usual eccentric.

The invention consists in employing a valve of peculiar construction, somewhat conical in form, within a cylindrical steam-chest, and so arranged that when worn it may be set up from the outside by means of a set-screw or any other known mechanical device which will accomplish the same end.

The valve is constructed with an opening through it for the emission of exhaust steam.

In the drawing—

A is a steam-chest, cylindrical in form, whose interior is slightly conical in its bore.

For the purpose of securing said steam-chest to the cylinder of a steam-engine flanges *a* are provided, and rectangular openings or ports *b*, coincident with similar openings or ports in the cylinder, afford communication between the steam-chest and cylinder.

Another rectangular opening or port, *c*, affords communication between the interior of the steam-chest and the exhaust-pipe, which is properly secured to the circular flange *d*. Steam is admitted to the steam-chest in any convenient manner.

The valve B is made of the form shown in fig. 2, circular in form, and slightly conical in shape, to fit the interior of the steam-chest A, within which it semi-rotates upon journals *e*, which pass through suitable bearings in the heads or ends of the steam-chest.

The sides of the valve are concave, as shown, in order to allow a space for steam between the sides and the walls of the steam-chest, by means of which an equal pressure is maintained upon both sides of the valve, whose faces, *f*, in the semi-rotation of the valve, alternately cover and uncover the ports *b*.

The motion of the valve is obtained by securing the connecting-rod of the eccentric of the engine to the crank *h*.

A rectangular opening, *i*, through the valve, and midway between the faces of the valve, receives the exhaust steam from the cylinder, and discharges it through the rectangular port *c* into the exhaust-pipe.

C is a yoke, fitting over the end of the journal to which the crank is attached, and is secured to the head by proper bolts.

A set-screw, K, passing through the yoke, engages with the end of the journal, and by its means, as the faces of the valve wear, the valve may be set up, thereby keeping it always tight.

What I claim as my invention, and desire to secure by Letters Patent, is—

The valve B, when constructed and operating substantially as set forth.

NELSON JENKINS.

Witnesses:
  JAS. I. DAY,
  H. S. SPRAGUE.